(12) United States Patent
Inoguchi et al.

(10) Patent No.: US 7,145,706 B2
(45) Date of Patent: Dec. 5, 2006

(54) IMAGE DISPLAYING APPARATUS

(75) Inventors: Kazutaka Inoguchi, Kanagawa (JP);
Akira Yamamoto, Kanagawa (JP);
Shoichi Yamazaki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 14 days.

(21) Appl. No.: 11/090,446

(22) Filed: Mar. 25, 2005

(65) Prior Publication Data
US 2005/0219671 A1 Oct. 6, 2005

(30) Foreign Application Priority Data
Mar. 31, 2004 (JP) ............................. 2004-104634

(51) Int. Cl.
*G02B 26/08* (2006.01)
(52) U.S. Cl. ...................................... 359/208; 359/630
(58) Field of Classification Search ................ 359/205, 359/208, 214, 627, 630, 631
See application file for complete search history.

(56) References Cited

U.S. PATENT DOCUMENTS 5,467,104 A 11/1995 Furness, III et al.
5,701,132 A 12/1997 Kollin et al.
6,222,676 B1 * 4/2001 Togino et al. .............. 359/630

FOREIGN PATENT DOCUMENTS

| JP | 11084291 | 3/1999 |
|----|----------|--------|
| JP | 2001-004955 | 1/2001 |
| JP | 2001-194617 | 7/2001 |

* cited by examiner

*Primary Examiner*—Euncha P. Cherry
(74) *Attorney, Agent, or Firm*—Morgan & Finnegan, LLP

(57) ABSTRACT

Disclosed is a compact image displaying apparatus which is high in light utilizing efficiency. The image displaying apparatus is provided with a light source, a scanning member for two-dimensionally scanning with light from the light source, and an optical system for directing the light deflected by the scanning member for scanning to an observer. The optical system is provided with an optical element in which a plurality of optical surfaces including refracting surfaces and internal reflecting surfaces are formed on a medium. The light deflected by the scanning member for scanning forms a two-dimensional image on a predetermined surface through a portion of the plurality of optical surfaces formed in the optical element. The plurality of optical surfaces formed in the optical element are disposed so that an effective area of the incidence surface of the optical element and an effective area of the internal reflecting surface may not overlap each other.

5 Claims, 6 Drawing Sheets

IMAGE DISPLAYING APPARATUS

BACKGROUND OF THE INVENTION

1. Field of the Invention

This invention relates to a scanning type image displaying apparatus, and particularly to an image displaying apparatus suitable, for example, for a head-mounted-display apparatus (HMD) or the like.

2. Description of the Related Art

At present, as a display element used in an HMD, there has been proposed one using a transmission type liquid crystal display element, a reflection type liquid crystal display element, an EL element or the like. These elements, however, require all pixels necessary for display to be installed therein and therefore, a pixel defect is liable to occur and the price of the element itself becomes very high.

In contrast, there has been disclosed and proposed a displaying apparatus for displaying an image by the use of not a two dimensional image display element such as a liquid crystal display element or an EL element, but a light source emitting a linear beam and a scanning member (scanner) for scanning the beam. U.S. Pat. No. 5,467,104 discloses a technique of scanning with lights of three colors, i.e., red (R), green (G) and blue (B), in a horizontal direction and a vertical direction, and directly forming an image on a retina through an optical system.

In the scanning type image displaying apparatus disclosed in the above-mentioned U.S. Pat. No. 5,467,104, however, it is required to scan with the lights at a very high speed and therefore, a very small device is used as a scanning member such as a mirror for scanning with the lights. Accordingly, there is the problem that a scanning light beam is a very thin one and the diameter of the light beam at an observer's pupil position becomes very small.

As a method of enlarging such a small emergence pupil diameter, there is a technique disclosed in U.S. Pat. No. 5,701,132. In U.S. Pat. No. 5,701,132, there is disclosed a configuration in which a surface to be scanned such as a lens array or a diffusing plate is scanned with modulated beam by a scanning member to thereby form an image, and the image to be transmitted through the surface to be scanned and observed is presented to an observer.

Also, Japanese Patent Application Laid-open No. H11-84291 discloses a configuration in which light from a light source is passed through a polygon-mirror-shaped deflector, whereafter an intermediate image is formed by the use of a free curved surface prism, and the intermediate image is directed to an observer by the use of a free curved surface prism.

Japanese Patent Application Laid-open No. 2001-4955 and Japanese Patent Application Laid-open No. 2001-194617 propose a relatively compact optical system for making light from a light source into a somewhat thick beam by the use of an eccentric free curved surface optical system, reflecting the beam by a scanning member and directing it to an eyeball.

When in order to use a small-diameter beam and yet enlarge the emergence pupil, use is made of the construction disclosed in U.S. Pat. No. 5,701,132, an intermediate image transmitting type surface to be scanned is used, and this leads to the problem that an optical path becomes long and the apparatus becomes bulky. On the other hand, if the diameter of the beam incident on the scanning member is made large to thereby make an emergence pupil large, the aberration correction of an intermediate image formed on the surface to be scanned through the scanning member becomes difficult and therefore, the realization of high optical performance becomes difficult and the size of an optical system is increased. Also, a large scanning member becomes necessary, and this leads to the problem that the apparatus becomes bulky and electric power required for scanning is increased.

SUMMARY OF THE INVENTION

In view of the above-noted problems, the present invention proposes a construction which can achieve further downsizing of an optical system, and particularly can achieve the downsizing of also an optical system requiring a great optical path length.

The exemplary image displaying apparatus of the present invention has a light source, a scanning member for two-dimensionally scanning light from the light source, and an optical system for directing the light scanned by the scanning member to an observer. The optical system of this image displaying apparatus is provided with an optical element in which a plurality of optical surfaces including a refracting surface and an internal reflecting surface are formed on one and the same medium. The light scanned by the scanning member forms a two-dimensional image on a predetermined surface through a portion of the plurality of optical surfaces of the optical element. The plurality of optical surfaces formed in this optical element are disposed so that an effective area on the incidence surface of the optical element and an effective area on the internal reflecting surface may not overlap each other.

DESCRIPTION OF THE PREFERRED EMBODIMENTS

Some embodiment of the present invention will hereinafter be specifically described with reference to the drawings.

Embodiment 1

Figure 1:
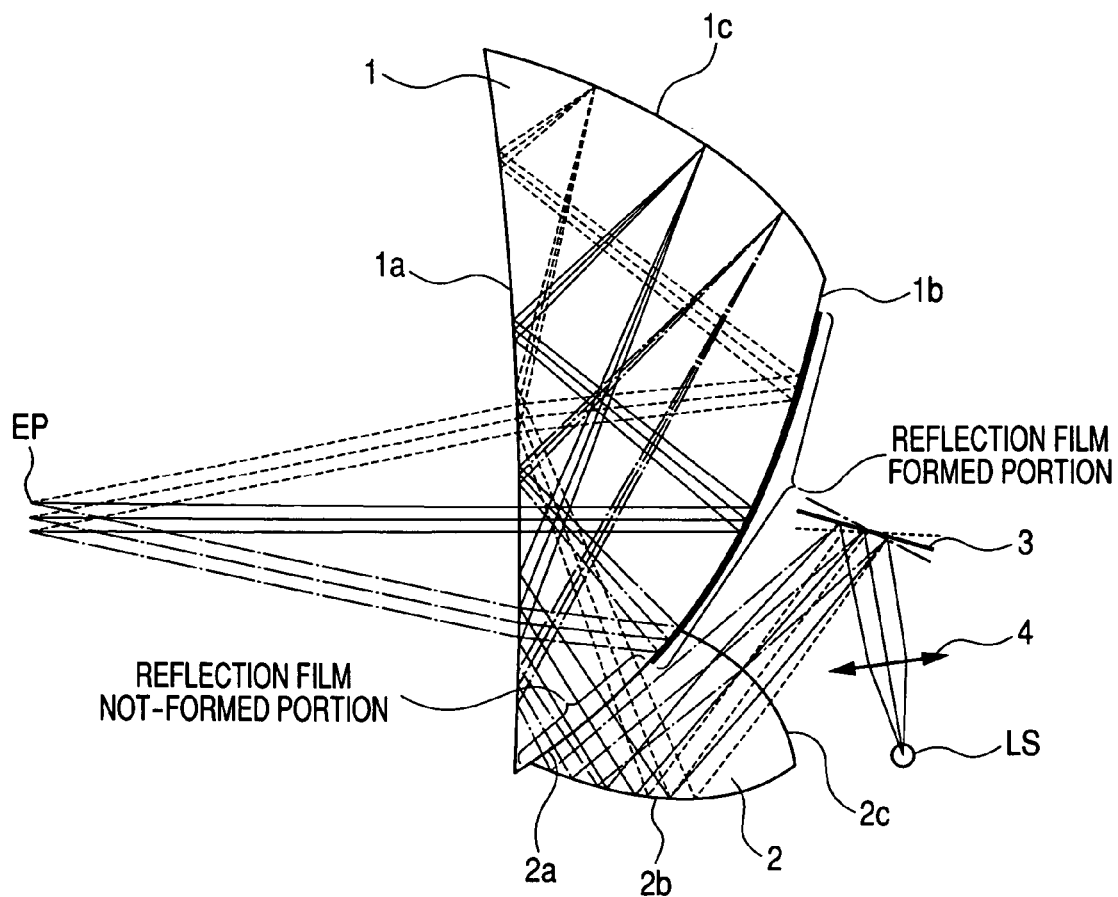
FIG. 1 shows optical paths in Embodiment 1 of the present invention.

FIG. 1 shows optical paths in the vertical cross section of an optical system of the image displaying apparatus according to first embodiment of the present invention. In FIG. 1, the reference numeral 1 designates a prism-shaped first optical element having three or more optical surfaces eccentric relative to an effective beam on a same medium. The optical surfaces provided in the optical element 1 include a plurality of reflecting surfaces having curvatures. The reference numeral 2 denotes a prism-shaped second optical element having an optical surface eccentric relative to the effective beam. The reference numeral 3 designates a reflection type two-dimensional scanning member. The reference numeral 4 denotes a converging optical system. The reference characters LS designate a light source. The reference characters EP denote the emergence pupil of an optical system substantially conjugate with the scanning member 3.

In FIG. 1, the light source LS emits a beam suitably modulated on the basis of an input signal corresponding to a displayed image. The beam emitted from the light source LS is converged by the converging optical system 4, and is incident on the scanning member 3. The beam is deflected in a two-dimensional direction by the scanning member 3, and is incident on the optical element 2 through a surface 2c. The beam incident on the optical element 2 is reflected on a reflecting surface 2b, and passes through a transmitting surface 2a joined to the surface 1b of the optical element 1 and emerges from the optical element 2, and is incident on the optical element 1. The light incident on the optical element 1 is reflected by a surface 1a and forms an intermediate image on a predetermined surface to be scanned. At this time, the surface to be scanned is a surface constituted by linking positions at which the intermediate image is formed together, and is generated substantially coincidently with the interior or the optical surface of the optical element 1.

In FIG. 1, there is shown a manner in which the scanning member 3 vibrates in the cross section (vertical direction) of FIG. 1, and represents the time when the scanning member 3 is in a reference state by solid lines, a state in which the scanning member 3 vibrates maximally in one direction by dotted lines, and a state in which the scanning member 3 vibrates maximally in an opposite direction by dot-and-dash lines. Likewise, the beams reflected in the respective states of the above-described scanning member 3 are represented by solid lines, dotted lines and dot-and-dash lines, respectively.

A surface 1c is a reflecting surface disposed near the surface to be scanned, and is a turn-back reflecting surface for reflecting the beam in a reverse direction so that the light incident on the reflecting surface 1c from the light source through the intermediary of the converging optical system 4, the optical element 2 and the reflecting surface 1a of the optical element 1 may be again incident on the reflecting surface 1a of the optical element 1. The beam reflected by the reflecting surface 1c is again reflected by the surface 1a, and then is reflected by the reflecting surface 1b, and thereafter passes through a transmitting surface 1a and forms the emergence pupil EP substantially conjugate with the scanning member 3. An observer puts his eye near the emergence pupil EP, whereby he can observe an image formed on the surface to be scanned.

Here, the transmitting surface 2c and reflecting surface 2b of the optical element 2, the transmitting surface 2a which is the joined surface of the optical element 2 and the optical element 1, and the reflecting surface 1a of the optical element 1 which lie on the optical path from after the beam emerges from the scanning member 3 until it reaches the surface to be scanned have the action as a scanning optical system, and together with the converging optical system 4, they act as a projection optical system for causing the beam emitted from the light source LS to be imaged on the surface to be scanned. On the other hand, an optical system constituted by the optical element 1 lying on the optical path forming the emergence pupil EP in the order of the surfaces 1a, 1b and 1a from the surface to be scanned has the action as an eyepiece optical system for the observer to enlargedly observe the image formed on the surface to be scanned.

In FIG. 1, by turning back the optical path by the turn-back reflecting surface 1c near the surface to be scanned, and giving the optical element 1 the action of two optical systems, i.e., the projection optical system and the eyepiece optical system, it is made possible to constitute the optical system by a small number of elements. Also, the optical paths of the two optical systems, i.e., the projection optical system and the eyepiece optical system, are contained in the optical element 1 and therefore, the optical system can be made compact relative to the entire optical path length.

Particularly, there is adopted a configuration in which the reflecting surface 1a is disposed so as to be used in common before and after the reflecting surface 1c near the surface to be scanned to thereby contain most of the optical path (scanning optical path) of the scanning optical system and the optical path (eyepiece optical path) of the eyepiece optical system in the optical element 1. Therefore, it contributes a great effect for making the optical system compact. That is, since the light incident on the optical element 1 via the scanning member 3 and the optical element 2 is reflected by the reflecting surface 1a in the optical element 1, the scanning optical path in the optical element can be secured long (the scanning optical path can be contained longer in a compact optical element) as compared with the size of the optical element. Also, the eyepiece optical path is configured to be folded by the use of the plurality of eccentric reflecting surfaces 1a and 1b, so that the eyepiece optical path can be contained longer in the compact optical element and also, the optical element can be made thin in one direction.

The optical system according to the present invention is configured such that the incidence surface 2a onto the optical element 1 in the projection optical system is combined to the reflecting surface 1b in the optical element 1 and used as a portion of the surface 1b and yet, the beam effective area of the incidence surface 2a onto the optical element and the beam effective area of the reflecting surfaces 1a and 1b in the optical element 1 in the eyepiece optical system do not have overlap therebetween.

Therefore, in spite of the optical element 1 being given the action of two optical systems, i.e., the projection optical system and the eyepiece optical system, it becomes possible to provide an optical system which suffers little from the light loss and which is bright. Also, by the incidence surface 2a being combined to the reflecting surface 1b, the optical member comprising the optical elements 1 and 2 can be made firm and also, the number of parts position-adjusted with the light source, the scanning means, etc. can be curtailed and the adjustment during the final assemblage can be made easy.

In the present embodiment, a reflection-type scanning member is used as the scanning member 3. By the reflection type-scanning member being used as the scanning member 3, the deflection angle of the beam can be secured twice as great as the deflection angle of the scanning member and therefore, it becomes possible to drive the scanning member with little electric power. Further, in the present embodiment, the scanning member 3 is a two-dimensional scanning member. This leads to an advantage that the curtailment of the number of light sources can be achieved for a construction comprising a one-dimensional light source array and a one-dimensional scanning member. Also, there is another advantage that the curtailment of the number of scanning members as well as the simplification of the construction of the optical system can be achieved for a construction using two one-dimensional scanning members. As a result of the adoption of the two-dimensional scanning member, there can be provided a low-cost and compact image displaying apparatus.

Figure 2:
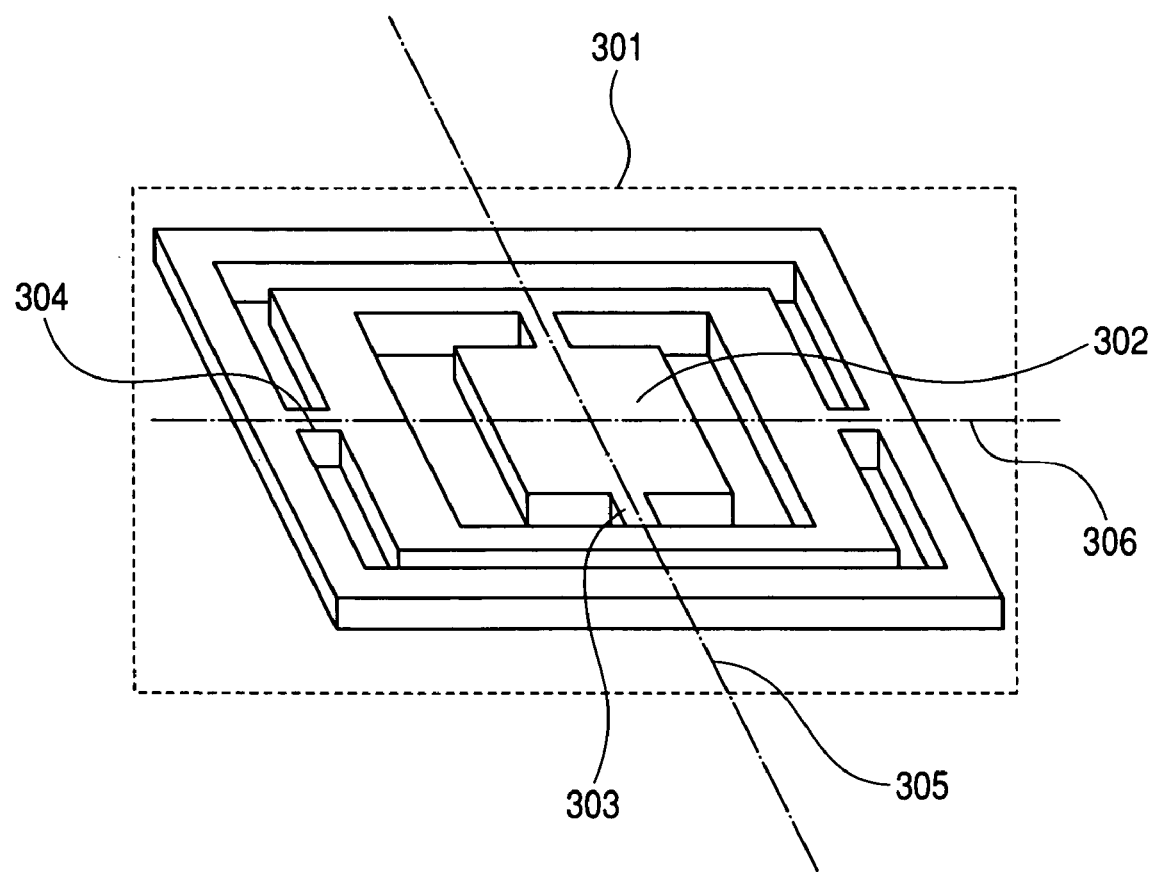
FIG. 2 illustrates an example of the specific construction of scanning means in Embodiment 1 of the present invention.

As an example of such a two-dimensional scanning member, use can be made of a device as shown in FIG. 2. FIG. 2 shows a micro electro mechanical system (MEMS) deflecting device 301 made by a semiconductor process technique. The deflecting device 301 has structure in which a minute mirror 302 having a deflecting surface (reflecting surface) is supported by torsion bars 303 and 304. The minute mirror 302 effects resonance reciprocating motion substantially about an axis 305 by the torsion bar 303 being distorted, and further effects reciprocating motion substantially about an axis 306 by the torsion bar 304 being distorted. By such reciprocating movement, the direction of a normal to the deflecting surface 302 is two-dimensionally changed to thereby reflect the beam incident on the minute mirror 302, and it becomes possible to scan in a two-dimensional direction.

In the present embodiment, the surface to be scanned and the reflecting surface 1c are made substantially coincident with each other and further, the reflecting surface 1c is made into a curved surface, whereby the reflecting surface 1c is endowed with the capability of hardly contributing to the formation of an intermediate image formed by the projection optical system, but deflecting only the principal ray. By such construction, it becomes possible to make the observer observe an image free of strain in such a manner as to negate the distortion caused by the projection optical system and the eyepiece optical system.

The optical system according to the present invention adopts a construction in which both of the projection optical system and the eyepiece optical system are configured to be eccentric with respect to any ray constituting an effective beam, whereby the optical element 1 is made to have the action of the projection optical system and the eyepiece optical system, and use the turn-back reflecting surface 1c in the optical element 1 so as to make optical path overlap each other to thereby enable the optical system to be constituted compact relative to the optical path length. Further, the incidence surface 2a (the surface combined to the surface 1b) onto the optical element 1 and the reflecting surface 1b of the optical element 1 are separated from each other to thereby provide a bright optical system.

That is, reflecting film is formed on a portion of the surface 1b which is indicated by a thick line in FIG. 1 and it is used as the beam reflecting surface of the eyepiece optical system, and is endowed with the function as a projection optical system for making the beam incident from a portion which is a reflection film not-formed portion, thereby preventing the light loss.

Due to an eccentric surface having a curvature being thus used to realize a compact and bright optical system, there occurs a non-rotation symmetrical aberration (eccentric aberration) which does not occur in a conventional coaxial rotation symmetrical optical system. In order to correct this eccentric aberration, it is preferable that the surface constituting the optical system be of a nonrotation symmetrical shape.

In the surfaces 1a and 1b acting as the eyepiece optical system, if optical power for converging the beam from the intermediate imaging surface is given chiefly to the surface 1b acting only as a reflecting surface, the optical element 1 can be made thin in the direction of the observer's visual axis since great optical power can be obtained in comparison with the transmitting surface even if the curvature in the reflecting surface is as same as that in the transmitting surface. Thus, it is preferable that the reflecting surface 1b be a surface strongest in optical power. Since the occurrence of eccentric aberration becomes great in an eccentric reflecting curved surface having great optical power, it is preferable in aberration correction to make the surface 1b into a nonrotation symmetrical surface to thereby suppress the occurrence of eccentric aberration. Further, if the surface 1a is also made into a nonrotation symmetrical surface and eccentric aberration is corrected by the entire eyepiece optical system, optical performance will be improved. On the other hand, it is preferable that the surfaces 2c, 2b, 2a and 1a corresponding to the scanning optical system portion of the projection optical system be also suitably made into nonrotation symmetrical surfaces in order to correct eccentric aberration. If the number of the nonrotation symmetrical surfaces is increased, the degree of freedom for aberration correction will be improved and therefore, again in the scanning optical system, an improvement in performance can likewise be expected. If in order to negate distortion by the projection optical system and the eyepiece optical system constituted by these eccentric optical surfaces, the turn-back reflecting surface 1c is also made into a nonrotation symmetrical surface to thereby correct nonrotation symmetrical distortion, an image having very little strain can be presented to the observer.

Figure 3:
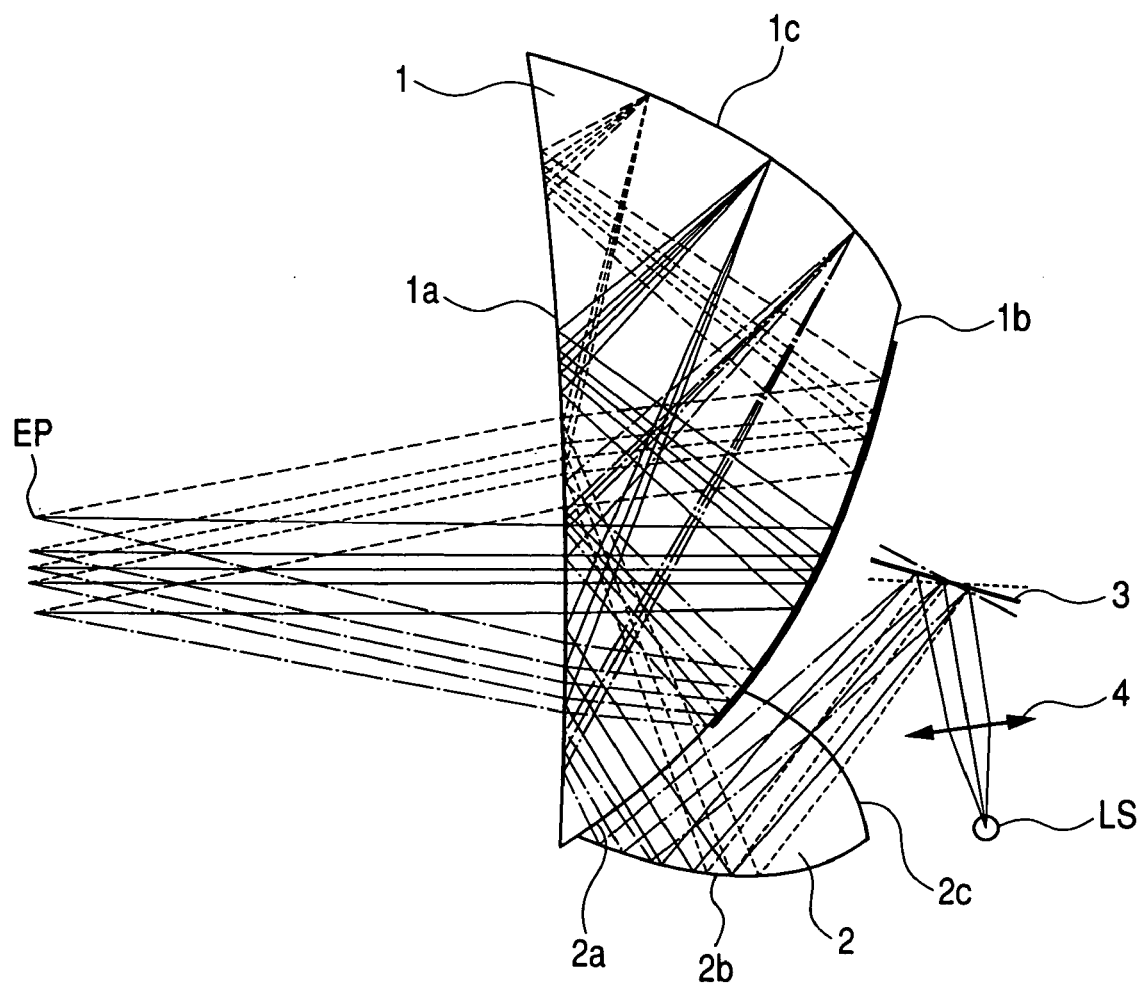
FIG. 3 shows optical paths when a diffusing reflecting plate is used in Embodiment 1 of the present invention.

Also, in FIG. 1, the reflecting surface 1c has been described as having no diffusing action, but by making the reflecting surface 1c into a diffusing reflecting surface as shown in FIG. 3, it is possible to enlarge the pupil diameter.

FIG. 3 illustrates the reflecting diffusing action the diffusing reflecting surface 1c has when the turn-back reflecting surface 1c near the surface to be scanned in the present embodiment is made into a diffusing reflecting surface. The beam emitted from the light source LS, suitably deflected by the scanning member and incident on the prism optical system is scanned on the reflecting surface 1c as the surface to-be scanned, and forms an intermediate image on the reflecting surface 1c. Here, the beam incident on the reflecting surface 1c is a thin convergent beam, however, the reflecting surface 1c is given the diffusing action, whereby the emergent beam becomes a beam having a great expanse as indicated by a thick line. Because the expanse of the beam becomes great, the beam reaching the emergence pupil EP has its diameter enlarged. Accordingly, the margin of the observer's pupil position from the center of the emergence pupil of the optical system increases and therefore, it becomes possible to observe the image easily.

When as described above, the reflecting surface 1c is a diffusing reflecting surface, it is necessary to make the intermediate image plane (the surface to be scanned) formed by the projection optical system and the reflecting surface 1c substantially coincident with each other. Therefore, it is preferable to design such that the diameter of the circle of least confusion by the projection optical system become twice as great as or less than a pixel pitch determined by the size and resolution of an imaging plane formed on the surface to be scanned. By satisfying this condition, it becomes possible to prevent the extreme lowering of the quality of image while enlarging the diameter of the emergence pupil by diffusing and reflection. More preferably, if design is made such that the diameter of the circle of least confusion by the projection optical system becomes equal to or less than the pixel pitch determined by the size and resolution of the imaging plane formed on the surface to be scanned, any substantial lowering of the quality of image will not occur and the observation of the image in a higher quality will become possible.

Also, as such a diffusing reflecting surface 1c, use can be made of a reflection type diffracting optical element or the like having periodic uneven structure on a reflecting surface, however, it is preferable to make the grating pitch thereof equal to or less than the pixel pitch to thereby prevent the resolving power from lowering. Also in the case of random uneven structure in which the diffusing refracting surface is not periodic, a similar effect can be obtained if design is made such that the maximum pitch of the unevenness becomes equal to or less than the pixel pitch.

Also, in FIGS. 1 and 3, only one light source is shown as the light source LS, but lights from light sources emitting red, green and blue lights independently of each other are combined together by color combining means, and the light source of each color is modulated in accordance with an image signal, whereby it is also possible to provide a color image to the observer.

Also, in the present embodiment, the beam is condensed as an inverted image without having an intermediate image in the optical path of the projection optical system and therefore, the optical power of each surface can be weakened and the curvature thereof can be made small, and the performance of the scanning optical system can be made good by a small number of optical surfaces.

Also, in the present embodiment, the turn-back reflecting surface is configured so as to be strong and easy to assemble and adjust as the surface 1c of the optical element 1, and the number of steps in the final assemblage can be decreased to thereby achieve the curtailment of the cost of assemblage and adjustment.

Also, in the present embodiment, considering with the turn-back reflecting surface 1c as the reference, the beam is reflected by the same surface 1a before and after the turn-back reflecting surface 1c to thereby make the optical paths from the surface 2a to the surface 1b overlap each other, and the degree of overlap between the optical paths is heightened by a small number of optical surfaces to thereby make the downsizing of the apparatus possible. That is, by sharing the reflecting surface 1a as the reflecting surface of the projection optical system and the reflecting surface of the eyepiece optical system, like the optical path 2a (the same surface as 1b)→1a→1c→1a→1b, a reciprocating optical path having the surface 1c as a turn-back point is formed in the prism to thereby increase the overlapping portions of the optical paths of the two optical systems.

Also, the surface 1a is made to act not only as the above-described reflecting surface on which the beam is reflected twice, but also as a beam emergence surface (transmitting surface) from the optical element 1 in the eyepiece optical system. It is also possible to endow the surface 1a with the two actions of reflection and transmission as a half-mirror, but if the respective surfaces are disposed so that the effective beam is incident on the surface 1a at an angle greater than a critical angle to thereby be internally totally reflected in case of reflection, and the effective beam is incident on the surface 1a at an angle less than the critical angle to thereby emerge from the optical element 1 in case of transmission, light utilizing efficiency is markedly improved and therefore, very bright image display can be achieved.

While the invention has been described with respect to an embodiment thereof, the present invention is not restricted to this construction, but numerous variations are conceivable. Other embodiments will hereinafter be mentioned and described by the use of numerical value examples.

Embodiment 2

Figure 4:
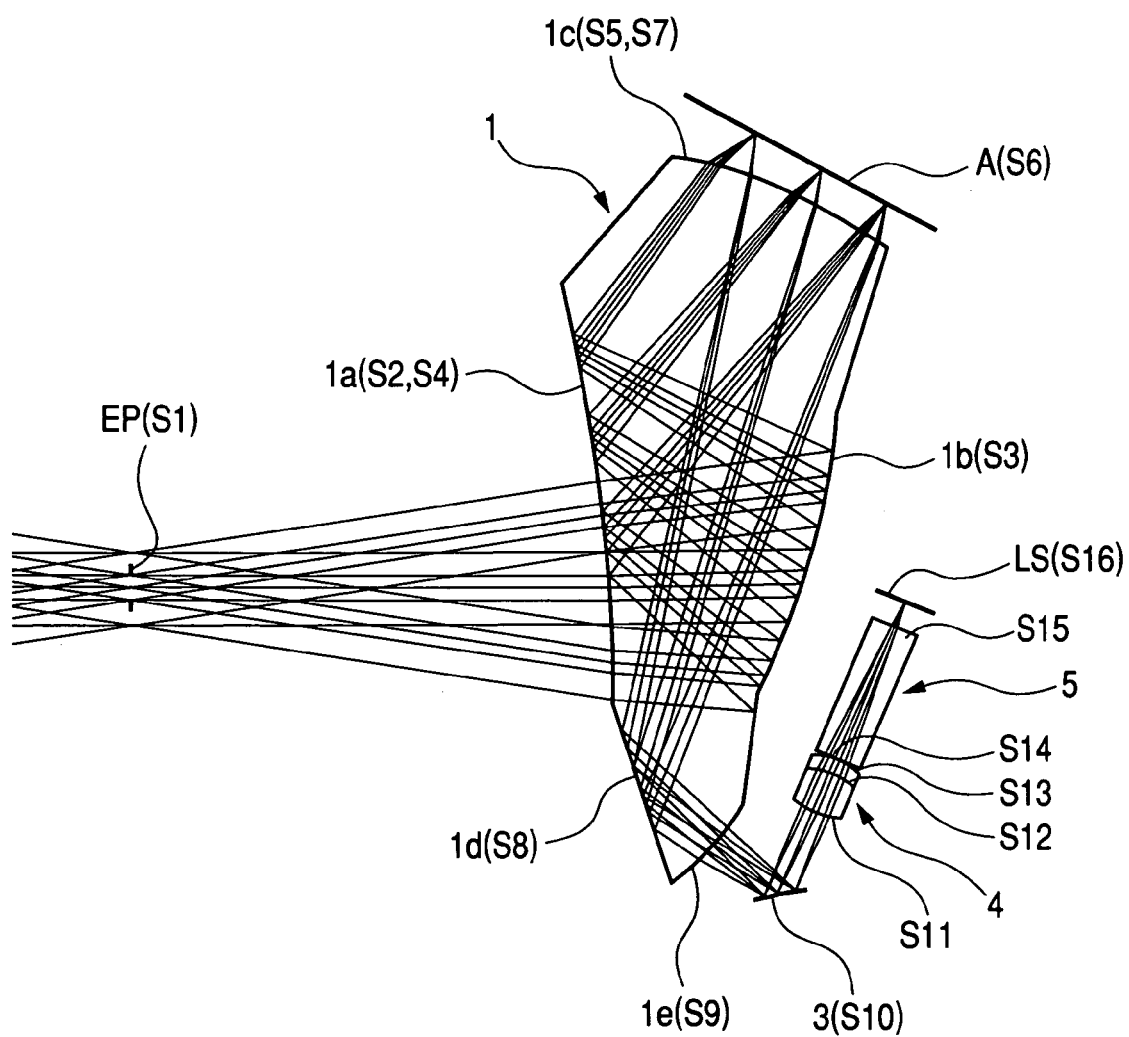
FIG. 4 shows optical paths in Embodiment 2 of the present invention.

FIG. 4 shows optical paths in the vertical cross section of the optical system of a second embodiment of the image displaying apparatus of the present invention. The great differences of the present embodiment from the above-described first embodiment are that a turn-back reflecting surface A is provided discretely from the optical element 1, that surfaces 1d and 1e are added in the optical element 1 and the optical element 2 has been eliminated, and that reflecting surfaces before and after the reflecting surface A, i.e., the reflecting surface 1d of the scanning optical system and the reflecting surface 1a of the eyepiece optical system, are configured as discrete surfaces. The present embodiment will hereinafter be described with reference to FIG. 4.

In FIG. 4, the light source LS emits a beam modulated on the basis of an input signal corresponding to a displayed image. The beam emitted from the light source LS is condensed by the converging optical system 4 and is incident on the scanning member 3. The beam is deflected in a two-dimensional direction by the scanning member 3, and is incident on the optical element 1 from the incidence surface 1e thereof. The beam incident on the optical element 1 is reflected by the reflecting surface 1d thereof, and passes through the transmitting surface 1c thereof and forms an intermediate image on a predetermined surface to be scanned. The letter A designates a reflecting surface disposed near the surface to be scanned, and it is a turn-back reflecting surface for reflecting the beam incident on the reflecting surface A from the light source through the converging optical system 4 and the optical element 1 so as to be again incident on the optical element 1. The beam reflected by the reflecting surface A is again incident on the optical element 1 from the transmitting surface 1c, is incident on the surface 1a at an angle greater than a critical angle and is internally totally reflected, and is reflected by the reflecting surface 1b, whereafter it is incident on the surface 1a at an angle less than the critical angle, emerges from the optical element 1 and forms an emergence pupil EP substantially conjugate with the scanning member 3. The observer puts his eyes near the emergence pupil EP, whereby he can observe an image formed on the surface to be scanned.

Here, the surfaces 1e, 1d, and 1c on the optical path, along which the beam emerges from the converging optical system 4 and the scanning member 3 and reaches the surface to be scanned, have the action as a scanning optical system for causing the beam emitted from the light source LS to be imaged on the surface to be scanned, and the optical system on the optical path which forms the emergence pupil EP in the order of the surfaces 1c, 1a, 1b and 1a from the surface to be scanned has the action as an eyepiece optical system for the observer to enlargedly observe therethrough the image formed on the surface to be scanned.

In the present embodiment, the optical path is turned back by the reflecting surface A near the surface to be scanned, and the optical element 1 is given the action of two optical systems, i.e., the scanning optical system and the eyepiece optical system, whereby it is made possible to constitute the optical system by a small number of elements. Also, the optical paths of the two optical systems, i.e., the scanning optical system and the eyepiece optical system, are contained in the optical element and therefore, the optical system can be made compact relative to the entire optical path length. Particularly, there is adopted a construction in which reflecting surfaces are disposed before and after the reflecting surface A near the surface to be scanned and most of the optical path (scanning optical path) of the scanning optical system and the optical path (eyepiece optical path) of the eyepiece optical system is contained in the optical element 1. This brings a great effect for making the optical system compact.

That is, the light incident on the optical element via the scanning member 3 is reflected by the reflecting surface 1d in the optical element and therefore, in comparison with the size of the optical element, the scanning optical path in the optical element can be secured longer (the scanning optical path can be contained longer in a compact optical element). Also, the eyepiece optical path is configured to be folded by the use of a plurality of eccentric reflecting surfaces 1a and 1b, and the eyepiece optical path can be contained longer in a compact optical element and also, the optical element can be made thin in one direction.

Also, in the present embodiment, design is made such that the beam effective area in the incidence surface 1e of the optical element 1 in the projection optical system and the beam effective areas of the reflecting surfaces 1a and 1b in the optical element 1 in the eyepiece optical system do not overlap each other. Therefore, in spite of the optical element 1 being given the action of two optical systems, i.e., the projection optical system and the eyepiece optical system, it becomes possible to provide a bright optical system which suffers little from the light loss.

Also, again in the present embodiment, a reflection-type two-dimensional scanning member is used as the scanning member 3. Accordingly, there can be provided a compact and low-cost image displaying apparatus having an effect similar to that shown in Embodiment 1.

Also, again in the present embodiment, the reflecting surface A is made coincident with the surface to be scanned and is given the diffusing action, whereby it is possible to enlarge the diameter of the emergence pupil.

In addition, again in the present embodiment, lights from the light sources emitting lights of three colors independently of each other are combined together by color combining means, and the light source of each color modulates the respective beam in accordance with an image signal, whereby it is also possible to provide a color image to the observer. In FIG. 4, there is disposed dummy glass 5 when the display of a color image is also supposed and a dichroic prism or the like is used as the color combining means.

Also, in the present embodiment, the beam is condensed as an inverted image without having an intermediate image as a light source image on the optical path of the scanning optical system and therefore, the optical power of each surface can be weakened and the curvature thereof can be made small. Also, in Embodiment 1, both of the beam reflecting surfaces before and after the turn-back mirror are the surface 1a, but in the present embodiment, they are divided into two surfaces 1a and 1b, whereby the optical degree of freedom is increased and the performance of the scanning optical system and the eyepiece optical system can be improved. Further, the turn-back reflecting surface and the surface 1c are separated from each other, whereby the aberration correction by the surface 1c also becomes possible.

Each of the surfaces 1a–1e of the optical element 1 in the present embodiment is constituted by a nonrotation symmetrical surface having no rotation symmetry axis. Also, the reflecting surface 1d and the reflecting surface 1a are constituted by surfaces represented by functions having different coefficients.

By thus adopting a construction having a single surface to be scanned as an imaging plane, on which the light source LS is formed an inverted image, on the optical path between the scanning member 3 and the emergence pupil 7 which are in a conjugate relation with each other, it is possible to shorten the optical path from the scanning means 4 to the surface to be scanned, and the downsizing of the optical system becomes possible.

Also, by constituting the scanning optical system and the eyepiece optical system by a prism having a surface utilized in common, it is possible to simplify the construction of the optical system.

Table 1 below shows the data of a numerical embodiment corresponding to Embodiment 2. In Table 1, the observer's horizontal angle of view is ±12 degrees (cross section perpendicular to the sheet plane), and the observer's vertical angle of view is ±9 degrees (cross section in the sheet plane).

The angle of deflection of the scanning member 3 in a horizontal direction (where the scanning member 3 vibrates in a direction perpendicular to the sheet plane about an axis in the sheet plane) is ±5.49 degrees, and the angle of deflection thereof in a vertical direction (where the scanning member 3 vibrates in the sheet plane about an axis perpendicular to the sheet plane) is ±4.118 degrees. The diameter of the incidence pupil is 1.35 mm.

While in the embodiment, description has been made in the order from the optical path on the light source side, in the numerical embodiment, description will be made in a form in which the ray is conversely pursued from the observer's pupil position side. In the description, the observer's pupil position as will be described below is represented as the standard of a global coordinates system. Embodiments 3 and 4 are also represented on the basis of a similar standard.

Three-dimensional coordinates axes in the global coordinates system are the Z-axis, the Y-axis and the X-axis, which are defined as follows. The Z-axis is defined as the direction of a straight line passing through the center of the first surface (the origin of absolute coordinates) and of the observer's visual line (a direction parallel to and opposite to the direction along which a ray, which is regularly reflected by the reflecting surface A to arrive at the emergence pupil, travels from the second surface to the first surface when the angle of deflection of the two-dimensional scanning member is ±0° both horizontally and vertically) is defined as positive direction. The Y-axis is defined as the direction of a straight line passing through the center of the first surface (the origin of the absolute coordinates) and perpendicular to the Z-axis in the paper plane, and direction counterclockwisely perpendicular to the Z-axis is defined as the positive direction. The X-axis is defined as the direction of a straight line passing through the origin and being perpendicular to the Z-axis and the Y-axis and extending toward the depth of the plane of the drawing sheet is defined as the positive direction.

With regard to each optical surface constituting the optical system, the origin position of a coordinates system (local coordinates system) for representing the surface shape of each optical surface in the above-mentioned global coordinates system is represented by X, Y, Z, and the inclination of yz-plane in the local coordinates system with respect to YZ-plane in the global coordinates system is described as A (the angle (in degree) of the z-axis of the local coordinates system with respect to the Z-axis of the global coordinates system with counterclockwise direction in the plane of the drawing sheet being positive direction), the inclination of xz-plane in the local coordinates system with respect to XZ-plane in the global coordinates system is described as B (the angle (in degree) of the z-axis of the local coordinates system with respect to the Z-axis of the global coordinates system with counterclockwise direction in the plane of the drawing sheet being positive direction), and the inclination of xy-plane in the local coordinates system with respect to XY-plane in the global coordinates system is described as C (the angle (in degree) of the y-axis of the local coordinates system with respect to the Z-axis of the global coordinates system with counterclockwise direction in the plane of the drawing sheet being positive direction). The local coordinates system of each surface can be defined as coordinates system by the x-, y- and z-axes defined above.

Also, Nd and νd in each surface represent the refractive index and Abbe number, respectively, of the medium of the surface and subsequent surface for d line (νd=(Nd−1)/(NF−NC) where NF represents the refractive index for F line, NC represents the refractive index for C line). Change in sign of the refractive index indicates that light is reflected on the surface.

A non-rotation symmetrical surface shape which does not have the rotation symmetry axis used in the present embodiment is expressed by a numerical expression as shown below.

In Numerical Embodiment 1, the following expression represented as XYP in the table is used as the non-rotation symmetrical surface.

$$z = \frac{cr^2}{1+\sqrt{1-(1+k)c^2r^2}} + c2x + c3y + c4x^2 + c5xy + c6y^2 + c7x^3 +$$
$$c8x^2y + c9xy^2 + c10y^3 + c11x^4 + c12x^3y + c13x^2y^2 + c14xy^3 +$$
$$c15y^4 + c16x^5 + c17x^4y + c18x^3y^2 + c19x^2y^3 + c20xy^4 + c21y^5 +$$
$$c22x^6 + c23x^5y + c24x^4y^2 + c25x^3y^3 + c26x^2y^4 + c27xy^5 +$$
$$c28y^6 + c29x^7 + c30x^6y + c31x^5y^2 + c32x^4y^3 + c33x^3y^4 +$$
$$c34x^2y^5 + c35xy^6 + c36y^7 + c37x^8 + c38x^7y + c39x^6y^2 +$$
$$c40x^5y^3 + c41x^4y^4 + c42x^3y^5 + c43x^2y^6 + c44xy^7 + c45y^8$$

Also, in the function above, the term regarding the odd order of X in the local coordinates system is made into 0, whereby a surface symmetrical with respect to YZ plane can be obtained.

Surfaces represented by XYP above are given symbols A, B, C, etc., and the aspherical surface coefficients Cij of those surfaces are shown in Table 2.

Also, in the present embodiment, anamorphic surfaces differing in curvature between the xz plane and yz plane of the local coordinates are used as some surfaces, and are represented as AAS in the table, and the radius of curvature in yz cross section is shown in the ordinary R term, and the radius of curvature in xy cross section is separately added as Rx.

Also, a case where the surface is a spherical surface is shown as SPH.

Embodiment 3

Figure 5:
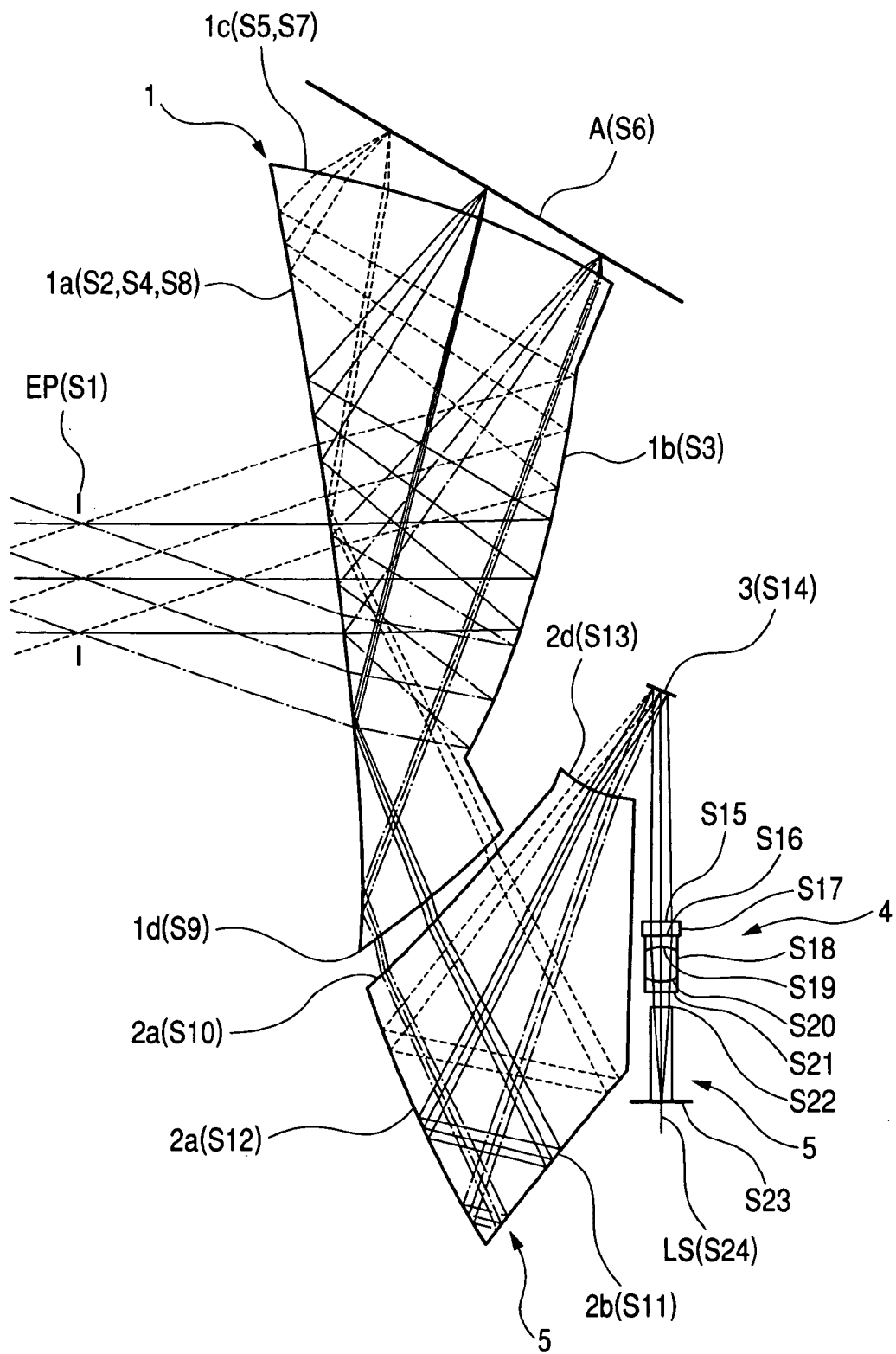
FIG. 5 shows optical paths in Embodiment 3 of the present invention.

FIG. 5 shows optical paths in the vertical cross section of an optical system constituting a third embodiment of the image displaying apparatus of the present invention. The great differences of the present embodiment from the afore-described first embodiment are that a turn-back reflecting surface A is provided discretely from the optical element 1, that the optical element 1 and the optical element 2 are not joined together, but are used discretely from each other, that a surface 2d is added in the optical element 2 to thereby increase the frequency of reflection in the optical element 2, and that the incidence surface 1d and reflecting surface 1b of the optical element 1 are constituted as discrete surfaces. The present embodiment will hereinafter be described with reference to FIG. 5.

In FIG. 5, the light source LS emits a beam directly modulated on the basis of an input signal corresponding to a displayed image. The beam emitted from the light source LS is condensed by the converging optical system 4, and is incident on the scanning member 3. The beam is deflected in a two-dimensional direction by the scanning member 3, and is incident on the optical element 2 from the surface 2d. The beam incident on the optical element 2 is reflected on the reflecting surfaces 2c and 2b, and thereafter passes through the transmitting surface 2a and travels toward the optical element 1. The light traveling toward the optical element 1 is incident on the optical element 1 from the surface 1b, and thereafter is reflected on the surface 1a, and passes through the surface 1c and forms an intermediate image on a predetermined surface to be scanned.

The letter A designates a reflecting surface disposed near the surface to be scanned, and it is a turn-back reflecting surface which reflects the beam in an opposite direction so that the light reflected by the reflecting surface 1a immediately before the surface A and incident on the reflecting surface A may be again reflected by the reflecting surface 1a. The beam reflected on the reflecting surface A is again incident on the optical element 1 from the surface 1c, is again reflected on the surface 1a, and next is reflected on the reflecting surface 1b, and thereafter passes through the transmitting surface 1a and forms an emergence pupil EP substantially conjugate with the scanning member 3. The observer can put his eyes near the emergence pupil EP to thereby observe an image formed on the surface to be scanned.

Here, each surface of the optical element 2 lying on the optical path from the scanning member 3 to the surface to be scanned, the transmitting surface 1b and the reflecting surface 1a which are the incidence surfaces of the optical element 1, and the transmitting surface 1c which is the emergence surface of the optical element 1 have the action as a scanning optical system, and act as a projection optical system which, in combination with the converging optical system 4, causes the beam emitted from the light source LS to be imaged on the surface to be scanned. On the other hand, the optical system constituted by the optical element 1 lying on an optical path, along which the light beam travels, in order from the surface to be scanned, through the surfaces 1c, 1a, 1b and 1a to form the emergence pupil EP, has the action as an eyepiece optical system for the observer to enlargedly observe the image formed on the surface to be scanned.

The present embodiment turns back the optical path by the turn-back reflecting surface A near the surface to be scanned, and gives the optical element 1 the action of two optical systems, i.e., the projection optical system and the eyepiece optical system, to thereby enable the optical system to be constituted by a small number of elements. Also, the optical paths of the two optical systems, i.e., the projection optical system and the eyepiece optical system, are contained in the optical element 1 and therefore, the optical system can be made compact relative to the entire optical path length. Particularly, because of a construction in which the surfaces 1c and 1a are disposed so as to be used in common before and after the reflecting surface A near the surface to be scanned and most of the optical path of the projection optical system (projection optical path) and the optical path of the eyepiece optical system (eyepiece optical path) is contained in the optical element 1, the effect of making the optical system compact is great.

That is, since the light incident on the optical element 1 from the transmitting surface 1d via the scanning member 3 and the optical element 2 is reflected on the reflecting surface 1a in the optical element 1 and is directed to the reflecting surface A through the transmitting surface 1c of the optical element 1, the scanning optical path in the optical element can be secured long as compared with the size of the optical element (the scanning optical path can be contained longer in a compact optical element). Also, the eyepiece optical path is designed such that the optical path of the light beam made incident on the optical element 1 from the transmitting surface 1c is folded by the use of a plurality of eccentric reflecting surfaces 1a and 1b, whereby the eyepiece optical path can be contained longer in a compact optical element and also, the optical element can be made thin in one direction.

Further, the present invention makes the incidence surface 1d onto the optical element 1 in the projection optical system discrete from the reflecting surface 1b in the optical element 1 to thereby improve optical performance, and yet is designed such that the beam effective area of the incidence surface 1a to the optical element 1 and the beam effective areas of the reflecting surfaces 1a and 1b in the optical element 1 in the eyepiece optical system do not have overlap. Therefore, in spite of giving the optical element 1 the action of the two optical systems, i.e., the projection optical system and the eyepiece optical system, it becomes possible to provide a bright optical system which suffers little from the light loss.

Also, again in the present embodiment, reflection type two-dimensional scanning means is used as the scanning means 3 and therefore, as in Embodiment 1, there can be provided a low-cost and compact image displaying apparatus.

Further, in the present embodiment, the reflecting surface A is given the diffusing action to thereby enlarge the pupil diameter.

In FIG. 5, with an assumption of the display of a color image, and the dummy glass 5 for the case where a dichroic prism or the like is used as color combining means is disposed.

Furthermore, in the present embodiment, on the optical path of the scanning optical system, the light source image is condensed as an inverted image without having an intermediate image and therefore, the optical power of each surface can be weakened and the curvature thereof can be made small. Also, each of the surfaces 1a–1c of the optical element 1 and the surfaces 2a–2d of the optical element 2 in the present embodiment are constituted by a non-rotation symmetrical surface having no rotation symmetry axis, respectively. Thereby, there is provided an optical system which corrects eccentric aberration to realize an optical system with high resolution, and which, even if it uses the planar turn-back reflecting surface A, well negate the distortion of the projection optical system including the scanning optical system and the distortion of the eyepiece optical system by each other and has very little distortion.

Table 3 below describes the data of a numerical embodiment corresponding to Embodiment 3. In Table 3, the observer's horizontal angle of view is ±25 degrees (cross section perpendicular to the plane of the drawing sheet), and the observer's vertical angle of view is ±14 degrees (cross section in the plane of the drawing sheet).

The angle of deflection of the scanning means 3 in the horizontal direction (vibrating perpendicular to the plane of the drawing sheet about an axis within the plane of the drawing sheet) is ±5.49 degrees, and the angle of deflection thereof in the vertical direction (vibrating in the plane of the drawing sheet about an axis perpendicular to the plane of the drawing sheet is the axis, and) is ±4.11 degrees. The diameter of the incidence pupil is 1.4 mm.

Also, in Numerical Embodiment 2 shown in Table 3 and Numerical Embodiment 3 shown in Table 5 described below, a non-rotation symmetrical surface shape represented as FFS in the tables can be expressed by a following expression. In the numerical embodiments, all are of a shape symmetrical with respect to YZ plane and therefore, in the following expression, the odd order terms of X are eliminated in advance.

$$z = \{(x^2 + y^2)/r\}/\{1 + SQRT(1 - (1 + c1)(x^2 + y^2)/r^2)\} + c5(x^2 - y^2) +$$
$$c6(2x^2 + 2y^2 - 1) + c10(3x^2y + 3y^3 - 2y) + c11(3x^2y - y^3) +$$
$$c12(x^4 - 6x^2y^2 + y^4) + c13(4x^4 - 4y^4 - 3x^2 + 3y^2) +$$
$$c14(6x^4 + 12x^2y^2 + 6y^4 - 6x^2 - 6y^2 + 1) +$$
$$c20(10yx^4 + 20x^2y^3 + 10y^5 - 12x^2y - 12y^3 + 3y) +$$
$$c21(15yx^4 + 10x^2y^3 + 5y^5 - 12x^2y + 4y^3) +$$
$$c22(5yx^4 - 10x^2y^3 + y^5) + c23(x^6 - 15x^4y^2 + 15x^2y^4 - y^6) +$$
$$c24(6x^6 - 30x^4y^2 - 30x^2y^4 + 6y^6 - 5x^4 + 30x^2y^2 - 5y^4) +$$
$$c25(15x^6 + 15x^4y^2 - 15x^2y^4 - 15y^6 - 20x^4 + 20y^4 + 6x^2 - 6y^2) +$$
$$c26(20x^6 + 60x^4y^2 + 60x^2y^4 + 20y^6 -$$
$$30x^4 - 60x^2y^2 - 30y^4 + 12x^2 + 12y^2 - 1)$$

The surfaces represented by FFS above are given symbols A, B, C, etc., and the aspherical surface coefficients Cij of those surfaces are shown in Table 4.

Embodiment 4

Figure 6:
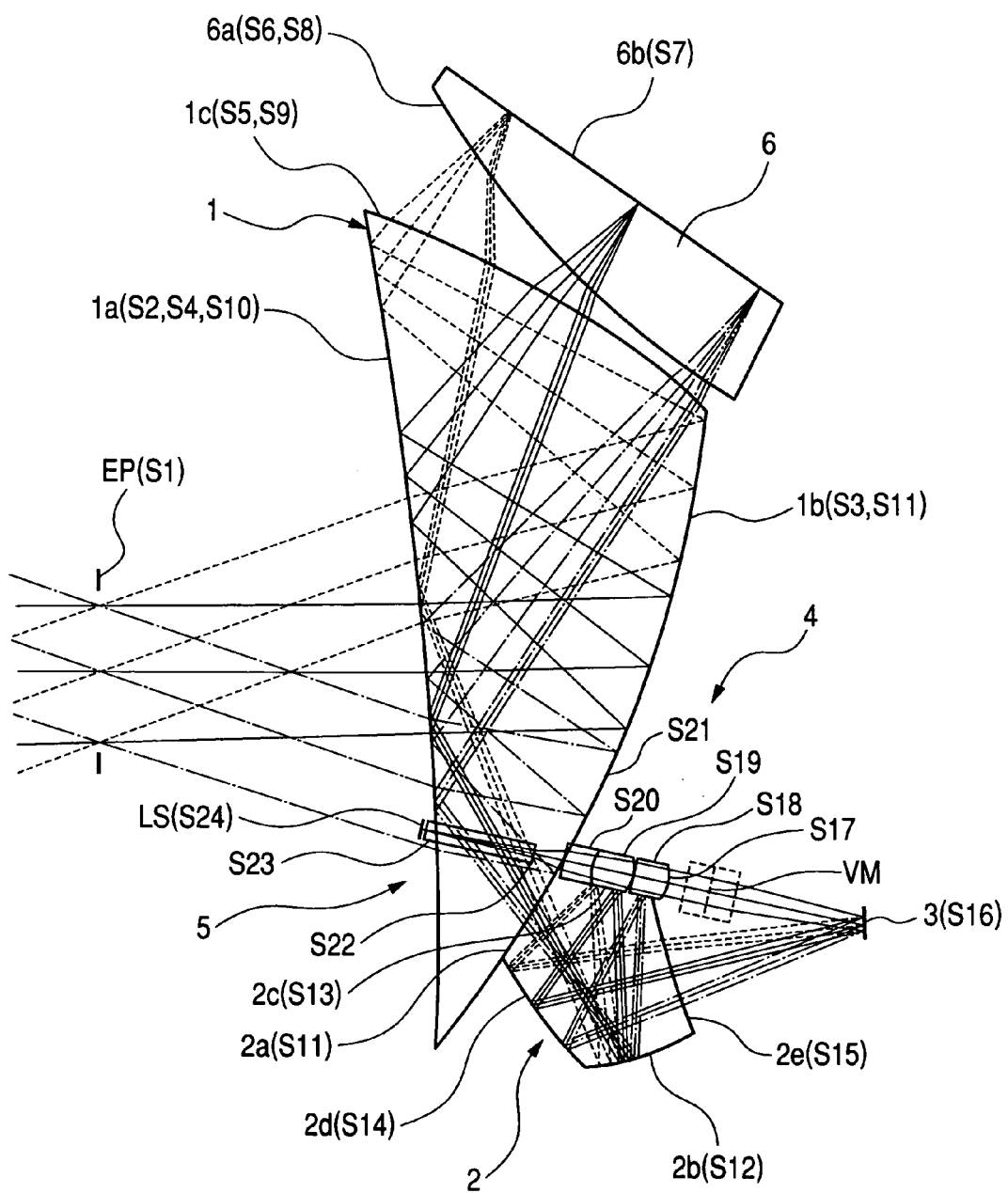
FIG. 6 shows optical paths in Embodiment 4 of the present invention.

FIG. 6 shows an optical path in the vertical cross section of an optical system which is a fourth embodiment of the present invention.

The great differences of the present embodiment from the aforedescribed first embodiment are that a turn-back reflecting surface is provided discretely from the optical element 1 and is made into the back reflecting surface 6b of an optical element 6 performing the function of a field lens, that an optical element 2 is added to thereby increase the frequency of reflection in the optical element 2, and that design is made such that an intermediate image is also formed between the scanning member and the reflecting surface 6b. The present embodiment will hereinafter be described with reference to FIG. 6.

In FIG. 6, a beam emitted from the light source LS is condensed by the converging optical system 4, and is incident on the scanning member 3. The beam is deflected in a two-dimensional direction by the scanning member 3, and is incident on the optical element 2 from the surface 2e thereof. The beam incident on the optical element 2 is reflected on a reflecting surface 2d, and thereafter forms an intermediate image, and is further reflected on reflecting surfaces 2c and 2b, and thereafter passes through a transmitting surface 2a which is a surface joined to the surface 1b of the optical element 1 and is incident on the optical element 1. The light incident on the optical element 1 is incident on the surface 1a at an angle greater than a critical angle and is internally totally reflected, and passes through the surface 1c and travels toward the optical element 6. The light traveling toward the optical element 6 is incident on the optical element 6 from the surface 6a thereof, and thereafter forms the second intermediate image on a surface to be scanned near a surface 6b. The surface 6b is a reflecting surface disposed near the surface to be scanned, and is a back mirror performing the role of the turn-back reflecting surface in the present embodiment, and reflects the light in an opposite direction so that the light reflected by the reflecting surface 1a immediately before the reflecting surface 6b and incident on the reflecting surface 6b is again reflected on the reflecting surface 1a. The beam reflected on the reflecting surface 6b emerges from the optical element 6 through the surface 6a, is again incident on the optical element 1 from the surface 1c, is incident on the surface 1a at an angle greater than the critical angle, is again internally totally reflected, and next is reflected on the reflecting surface 1b, and thereafter is incident on the surface 1a at an angle smaller than the critical angle and passes through the transmitting surface 1a and forms an emergence pupil EP substantially conjugate with the scanning member 3. The observer can put his eyes near the emergence pupil EP to thereby observe an image formed on the surface to be scanned.

Here, the surfaces of the optical element 2 lying on the optical path from the scanning member 3 to the surface to be scanned, the reflecting surface 1a and transmitting surface 1c of the optical element 1, and the transmitting surface 6a of the optical element 6 have the action as a scanning optical system, and acts as a projection optical system which, in combination with the converging optical system 4, causes the beam emitted from the light source LS to be imaged on the surface to be scanned. On the other hand, the optical system by the optical elements 6 and 1 lying on an optical path, along which the light beam travels, in order from the surface to be scanned, through the surfaces 6a, 1c, 1a, 1b and 1a to form the emergence pupil EP, has the action as an eyepiece optical system for the observer to enlargedly observe an image formed on the surface to be scanned.

The present embodiment turns back the optical path by the turn-back reflecting surface (surface 6b) near the surface to be scanned, and gives the transmitting surface 6a of the optical element 6 and the optical element 1 the action of two optical systems, i.e., the projection optical system and the eyepiece optical system to thereby enable an optical system to be constituted by a small number of elements. In addition, since the optical paths of the two optical systems, i.e., the projection optical system and the eyepiece optical system, are contained in the optical elements 6 and 1, the optical system can be made compact relative to the entire optical path length. Particularly, because of a construction in which the surfaces 1a, 1b and 1c are disposed so as to be used in common before and after the reflecting surface 6b near the surface to be scanned and most of the optical path of the projection optical system and the optical path of the eyepiece optical system is contained in the optical element 1, the effect of making the optical system compact is great.

That is, the light incident on the optical element 1 from the transmitting surface 1b (2a) via the scanning member 3 and the optical element 2 is reflected by the reflecting surface 1a in the optical element 1 and is directed to the reflecting surface 6b through the transmitting surface 1c of the optical element 1 and therefore, the scanning optical path in the optical element can be secured longer as compared with the size of the optical element. Further, for the eyepiece optical path, design is made such that the optical path of the light made incident on the optical element 1 from the transmitting surface 1a is folded by the use of a plurality of eccentric reflecting surfaces 1a and 1b, whereby the eyepiece optical path can be contained longer in a compact optical element and also, the optical element can be made thin in one direction.

In the present embodiment, the incidence surface 2a to the optical element 1 in the projection optical system is combined to the reflecting surface 1b in the optical element 1 and is used as a portion of the surface 1b, and yet is designed such that the beam effective area of the incidence surface 2a to the optical element 2 and the beam effective areas of the reflecting surfaces 1a and 1b in the optical element 1 in the eyepiece optical system do not have overlap. Therefore, in spite of giving the optical element 1 the action of the two optical systems, i.e., the projection optical system and the eyepiece optical system, it becomes possible to provide a bright optical system which suffers little from the light loss.

Further, in the present embodiment, the reflecting surface 6b is given the diffusing action to thereby enlarge the pupil diameter.

In FIG. 6, with an assumption of the display of a color image, and the dummy glass 5 for the case where a dichroic prism or the like is used as color combining means is disposed.

Furthermore, in the present embodiment, design is made such that an intermediate image is formed as the light source image on the optical path of the scanning optical system and therefore, the optical power of each surface is strong, however, the optical paths are made to intersect with each other on the reflecting surfaces 2b, 2c and 2d to thereby make the optical element 2 compact. In addition, in the present embodiment, the transmitting surface of the optical element 6 is constituted by a non-rotation symmetrical surface and the reflecting surface 6b is made into a planar back reflecting surface, and yet the distortion of the projection optical system including the scanning optical system and the distortion of the eyepiece optical system are well negated by each other to thereby provide an optical system having very little distortion. Also, the surface 6a is made into a refracting surface having positive refractive power so as to correct field curvature occurring in the reflecting surface 1b having strong optical power, and improve also the optical performance of the eyepiece system singly.

Also, when the beam is made incident on the optical element 1 from the surface 2a combined with the surface 1b, a pupil conjugate with the reflecting surface 3 of the scanning means which is the incidence pupil of the optical system is formed near the surface 2a, whereby it is possible to use a portion of the surface 1b for the incidence of the scanning beam and another portion of the surface 1b for the reflection of the eyepiece beam, separately, without making the surface 1b bulky, and both of downsizing and an improvement in light utilizing efficiency can be achieved. As will also be seen in FIG. 6, the pupil is formed between the reflecting surface 2b and the reflecting surface 1a, which are reflecting surfaces before and after the scanning beam incidence surface 2a (1b) to the optical element 1, and the incidence area of the scanning optical system beam is narrowed to thereby make the surface 1b small.

Also, in FIG. 6, the converging optical system 4 and the dummy glass 5 are depicted as interfering with the optical elements 1 and 2, however, actually a mirror VM indicated by dotted lines is disposed and the optical path is bent in a direction perpendicular to the plane of the drawing sheet, whereby a compact image display apparatus can be realized without the converging optical system and the dummy glass interfering with the optical elements.

Table 5 below describes the data of Numerical Embodiment 3 corresponding to Embodiment 4. In Table 5, the observer's horizontal angle of view is ±25 degrees (cross section perpendicular to the plane of the drawing sheet), and the observer's vertical angle of view is ±14 degrees (cross section in the plane of the drawing sheet).

The angle of deflection of the scanning member 3 in the horizontal direction (vibration in the direction perpendicular to the plane of the drawing sheet about an axis in the plane of the drawing sheet) is ±5.49 degrees, and the angle of deflection thereof in the vertical direction (vibration in the plane of the drawing sheet about an axis perpendicular to the plane of the drawing sheet) is ±4.118 degrees. The diameter of the incidence pupil is 1.4 mm.

In Table 6, the surfaces represented by FFS in Table 5 are given symbols A, B, C, etc., and the aspherical surface coefficients Cij of those surfaces are shown.

TABLE 1

| surf | Y | Z | A | R | type | nd | vd |
|---|---|---|---|---|---|---|---|
| 1 | 0 | 0 | 0 | ∞ | SPH | 1 | |
| 2 | 12.1643 | 24.3397 | 10.1843 | ∞ | XYP-A | 1.53 | 55.8 |
| 3 | −11.1154 | 31.2221 | −29.231 | −379.298 | XYP-B | −1.53 | 55.8 |
| 4 | 12.1643 | 24.3397 | 10.1843 | ∞ | XYP-A | 1.53 | 55.8 |
| 5 | 23.5325 | 30.85889 | 78.1234 | ∞ | XYP-C | 1 | |
| 6 | 23.2541 | 37.32731 | 60.6645 | ∞ | SPH | −1 | |
| 7 | 23.5325 | 30.8589 | 78.1234 | ∞ | XYP-C | −1.53 | 55.8 |
| 8 | 0.4732 | 23.7503 | 18.7396 | −5940.41 | XYP-D | 1.53 | 55.8 |
| 9 | −16.5333 | 29.02948 | −49.7351 | 7.4038 | XYP-E | 1 | |
| 10 | −17.1864 | 34.76619 | −76.6161 | ∞ | SPH | −1 | |
| 11 | −12.6051 | 36.7692 | −66.3839 | −5.7818 | SPH | −1.516 | 64.14 |
| 12 | −10.3757 | 37.744 | −66.3839 | 2.7379 | SPH | −1.699 | 30.13 |
| 13 | −9.6812 | 38.0476 | −66.3839 | 5.6982 | SPH | −1 | |
| 14 | −9.5896 | 38.0877 | −66.3839 | ∞ | | −1.516 | 64.14 |
| 15 | −2.2596 | 41.2926 | −66.3839 | ∞ | | −1 | |
| 16 | −0.8852 | 41.8935 | −66.3839 | ∞ | | | |

TABLE 2

XYP-A  c4 = 0.000e+000  c6 = 0.000e+000  c8 = −9.933e−003  c10 = −4.932e−004
       c11 = −8.388e−005  c13 = 0.000e+000  c17 = 1.214e−005  c19 = 0.000e+000  e21 = 2.493e−007
       c22 = −8.821e−008  c24 = −4.103e−007  c26 = 2.244e−008  c28 = 1.474e−008  c30 = 0.000e+000
       c32 = 0.000e+000  c34 = 0.000e+000  c36 = 0.000e+000  c37 = 0.000e+000  c39 = 0.000e+000
       c41 = 0.000e+000  c43 = 0.000e+000  c45 = 0.000e+000
XYP-B  c4 = 0.000e+000  c6 = 0.000e+000  c8 = −5.676e−003  c10 = −6.193e−005
       c11 = −1.56e−006  c13 = 0.000e+000  c17 = 1.526e−005  c19 = 0.000e+000  c21 = −2.559e−008
       c22 = −1.804e−009  c24 = −1.664e−008  c26 = −9.598e−009  c28 = 1.670e−010  c30 = −9.622e−010
       c32 = −5.279e−011  c34 = −1.102e−010  c36 = −7.324e−012  c37 = −4.409e−011  c39 = 1.014e−010
       c41 = −2.801e−012  c43 = 7.994e−012  c45 = 2.108e−013
XYP-C  c4 = 0.000e+000  c6 = 0.000e+000  c8 = −8.853e−003  c10 = 6.126e−003
       c11 = −1.499e−004  c13 = 0.000e+000  c17 = −1.823e−005  c19 = 0.000e+000  c21 = 8.709e−005
       c22 = −2.144e−006  c24 = 4.517e−007  c26 = 5.587e−007  c28 = 2.563e−006  c30 = 1.696e−007
       c32 = 1.200e−007  c34 = 0.000e+000  c36 = 1.340e−009  c37 = 5.715e−008  c39 = 5.999e−009
       c41 = 6.403e−009  c43 = −2.462e−009  c45 = 1.383e−016
XYP-D  rdy = −5.940e+003  c4 = 0.000e+000  c6 = 0.000e+000  c8 = −4.093e−003  c10 = −2.934e−004
       c11 = −2.926e−004  c13 = 0.000e+000  c17 = −1.515e−005  c19 = 0.000e+000  c21 = −3.020e−007
       c22 = −3.326e−005  c24 = −4.4093e−006  c26 = −1.712e−007  c28 = −2.666e−009  c30 = −3.326e−007
       c32 = 2.454e−008  c34 = −2.076e−009  c36 = −1.547e−011  c37 = −9.269e−009  c39 = 2.313e−007
       c41 = 4.279e−009  c43 = 3.452e−011  c45 = −2.163e−013
XYP-E  rdy = 7.404e+000  c4 = 0.000e+000  c6 = 0.000e+000  c8 = −1.118e−001  c10 = 4.559e−003
       c11 = −1.456e−003  c13 = 0.000e+000  c17 = −2.918e−003  c19 = 0.000e+000  c21 = −6.299e−004
       c22 = 4.347e−005  c24 = 1.932e−004  c26 = −3.394e−004  c28 = 7.744e−005  c30 = 2.413e−005
       c32 = 1.309e−006  c34 = 5.942e−005  c36 = 7.759e−007  c37 = 1.556e−005  c39 = −1.730e−005
       c41 = −5.800e−006  c43 = −4.614e−006  c45 = −6240e−007

TABLE 3

| SURF | X | Y | Z | A | R | typ | Nd | vd |
|---|---|---|---|---|---|---|---|---|
| 1 | 0 | 0 | 0 | 0 | ∞ | SPH | 1 | |
| 2 | 0 | −29.4315 | 24.35997 | 0.4896 | −290.141 | FFS-A | 1.5709 | 33.8 |
| 3 | 0 | −22.389 | 29.37169 | −32.9241 | −70.2912 | FFS-B | −1.5709 | 33.8 |
| 4 | 0 | −29.4315 | 24.35997 | 0.4896 | −290.141 | FFS-A | 1.5709 | 33.8 |
| 5 | 0 | 30.24191 | 38.85668 | 66.3645 | −83.7271 | FFS-C | 1 | |
| 6 | 0 | 34.13832 | 35.96789 | 59.6361 | ∞ | SPH | −1 | |
| 7 | 0 | 30.24191 | 38.85668 | 66.3645 | −83.7271 | FFS-C | −1.5709 | 33.8 |
| 8 | 0 | −29.4315 | 24.35997 | 0.4896 | −290.141 | FFS-A | 1.5709 | 33.8 |
| 9 | 0 | −29.1939 | 28.74523 | −51.8811 | −116.387 | FFS-D | 1 | |

TABLE 3-continued

| SURF | X | Y | Z | A | R | typ | Nd | vd |
|---|---|---|---|---|---|---|---|---|
| 10 | 0 | −26.9193 | 33.94957 | −41.8196 | −146.849 | FFS-E | 1.5709 | 33.8 |
| 11 | 0 | −44.5943 | 46.4004 | −37.0143 | −207.33 | FFS-F | −1.5709 | 33.8 |
| 12 | 0 | −35.8857 | 24.92037 | 18.8967 | 513.2259 | FFS-G | 1.5709 | 33.8 |
| 13 | 0 | −16.5074 | 41.97014 | 38.9434 | 121.4113 | FFS-H | 1 | |
| 14 | 0 | −9.87237 | 50.62256 | 74.1287 | ∞ | SPH | −1 | |
| 15 | 0 | −30.0885 | 50.66797 | 90.1287 | −10.8531 | AAS | −1.5163 | 64.1 |
| 16 | 0 | −31.1353 | 50.67032 | 90.1287 | ∞ | SPH | −1 | |
| 17 | 0 | −31.3353 | 50.67077 | 90.1287 | ∞ | SPH | −1.6477 | 33.8 |
| 18 | 0 | −32.3353 | 50.67302 | 90.1287 | −107.878 | SPH | −1 | |
| 19 | 0 | −32.5353 | 50.67347 | 90.1287 | −6.226 | SPH | −1.5163 | 64.1 |
| 20 | 0 | −34.7513 | 50.67845 | 90.1287 | 6.4598 | SPH | −1.6477 | 33.8 |
| 21 | 0 | −36.1229 | 50.68153 | 90.1287 | 41.8757 | SPH | −1 | |
| 22 | 0 | −37.6229 | 50.6849 | 90.1287 | ∞ | SPH | −1.5163 | 64.1 |
| 23 | 0 | −45.6229 | 50.70287 | 90.1287 | ∞ | SPH | −1 | |
| 24 | 0 | −46.1229 | 50.70399 | 90.1287 | ∞ | SPH | | |

TABLE 4

| FFS-A | c5: −2.4124e−004 | c6: −2.7643e−004 | c10: −2.7819e−006 | c11: −8.7690e−006 |
|---|---|---|---|---|
| | c12: 2.6009e−008 | c13: −1.3322e−007 | c14: −8.4560e−008 | c20: −1.9955e−011 |
| | c21: −1.8861e−011 | c22: 3.1988e−010 | c23: −4.3909e−012 | c24: 4.7439e−013 |
| | c25: 9.6562e−015 | c26: −8.5700e−014 | | |
| FFS-B | c5: −1.4789e−004 | c6: 4.0995e−004 | c10: 2.9978e−007 | c11: −7.4085e−006 |
| | c12: 3.5776e−008 | c13: −7.8824e−008 | c14: −2.3188e−008 | c20: 4.1940e−011 |
| | c21: 1.4234e−010 | c22: −1.2395e−010 | c23: −2.5504e−012 | c24: −5.9295e−012 |
| | c25: −2.6969e−012 | c26: 3.7901e−012 | | |
| FFS-C | c5: 4.5190e−004 | c6: −1.1972e−003 | c10: −9.1680e−008 | c11: −4.1463e−005 |
| | c12: 9.5562e−007 | c13: −4.0398e−008 | c14: 3.2672e−007 | c20: −3.2189e−009 |
| | c21: 2.0364e−009 | c22: 2.1004e−008 | c23: −7.1959e−010 | c24: 3.4029e−011 |
| | c25: −8.8901e−011 | c26: −2.7276e−011 | | |
| FFS-D | c5: −2.4124e−004 | c6: −2.7643e−004 | c10: −2.7819e−006 | c11: −8.7690e−006 |
| | c12: 2.6009e−008 | c13: −1.3322e−007 | c14: −8.4560e−008 | c20: −1.9955e−011 |
| | c21: −1.8861e−011 | c22: 3.1988e−010 | c23: −4.3909e−012 | c24: 4.7439e−013 |
| | c25: 9.6562e−015 | c26: −8.5700e−014 | | |
| FFS-E | c5: 4.1482e−003 | c6: 1.1263e−003 | c10: 7.9511e−006 | c11: 3.7049e−004 |
| | c12: 2.8535e−006 | c13: −7.9924e−006 | c14: −1.5011e−006 | |
| FFS-F | c5: −4.8662e−004 | c6: 2.0690e−004 | c10: 1.0510e−004 | c11: 3.1160e−004 |
| | c12: −3.5772e−006 | c13: −9.9578e−007 | c14: −1.8078e−006 | |
| FFS-G | c5: −7.5966e−004 | c6: −6.3523e−004 | c10: −2.1890e−005 | c11: 2.4626e−005 |
| | c12: −4.0577e−007 | c13: 1.7202e−007 | c14: 1.0621e−007 | |
| FFS-H | c5: −1.6266e−003 | c6: 9.1560e−005 | c10: −1.0600e−005 | c11: −7.7394e−006 |
| | c12: −3.6783e−007 | c13: −3.2778e−007 | c14: −6.2683e−008 | |
| FFS-I | c5: −2.5778e−002 | c6: 2.2926e−002 | c10: 6.4620e−004 | c11: 6.2273e−004 |
| | c12: −3.9885e−005 | c13: −4.1931e−005 | c14: 4.0438e−005 | |
| AAS | Rx: −11.8957 | | | |

TABLE 5

| SURF | X | Y | Z | A | R | typ | Nd | vd |
|---|---|---|---|---|---|---|---|---|
| 1 | 0.000 | 0.000 | 0.000 | 0.000 | ∞ | SPH | 1.0000 | 0.0 |
| 2 | 0.000 | −15.420 | 24.338 | 0.750 | −242.1649 | FFS-A | 1.5709 | 33.8 |
| 3 | 0.000 | −16.928 | 31.570 | −31.183 | −101.5141 | FFS-B | −1.5709 | 33.8 |
| 4 | 0.000 | −15.420 | 24.338 | 0.750 | −242.1649 | FFS-A | 1.5709 | 33.8 |
| 5 | 0.000 | 32.061 | 23.551 | 65.176 | −41.1239 | FFS-C | 1.0000 | 0.0 |
| 6 | 0.000 | 28.565 | 35.060 | 43.987 | −36.6052 | FFS-D | 1.5709 | 33.8 |
| 7 | 0.000 | 36.167 | 35.999 | 54.230 | ∞ | SPH | −1.5709 | 33.8 |
| 8 | 0.000 | 28.565 | 35.060 | 43.987 | −36.6052 | FFS-D | −1.0000 | 0.0 |
| 9 | 0.000 | 32.061 | 23.551 | 65.176 | −41.1239 | FFS-C | −1.5709 | 33.8 |
| 10 | 0.000 | −15.420 | 24.338 | 0.750 | −242.1649 | FFS-A | 1.5709 | 33.8 |
| 11 | 0.000 | −16.928 | 31.570 | −31.183 | −101.5141 | FFS-E | 1.5709 | 33.8 |
| 12 | 0.000 | −16.928 | 31.570 | −31.183 | −101.5141 | FFS-F | 1.5709 | 33.8 |
| 13 | 0.000 | −28.868 | 35.553 | −79.788 | −26.7032 | FFS-G | −1.5709 | 33.8 |
| 14 | 0.000 | −16.178 | 37.479 | −106.427 | −80.5852 | FFS-H | 1.5709 | 33.8 |
| 15 | 0.000 | −22.987 | 30.018 | −150.332 | −27.4085 | FFS-I | −1.5709 | 33.8 |
| 16 | 0.000 | −20.790 | 40.571 | −168.355 | −165.7329 | FFS-J | −1.0000 | 0.0 |
| 17 | 0.000 | −18.975 | 55.029 | 0.215 | ∞ | SPH | 1.0000 | 0.0 |
| 18 | 0.000 | −15.533 | 40.411 | −13.252 | −11.0395 | SPH | 1.5163 | 64.1 |
| 19 | 0.000 | −15.056 | 38.389 | −13.252 | ∞ | SPH | 1.0000 | 0.0 |
| 20 | 0.000 | −14.984 | 38.080 | −13.252 | −7.8395 | SPH | 1.5163 | 64.1 |
| 21 | 0.000 | −14.354 | 35.406 | −13.252 | 4.6930 | SPH | 1.6477 | 33.8 |
| 22 | 0.000 | −13.867 | 33.341 | −13.252 | 16.4373 | SPH | 1.0000 | 0.0 |

TABLE 5-continued

| SURF | X | Y | Z | A | R | typ | Nd | vd |
|---|---|---|---|---|---|---|---|---|
| 23 | 0.000 | −13.409 | 31.394 | −13.252 | ∞ | SPH | 1.5168 | 64.2 |
| 24 | 0.000 | −11.575 | 23.607 | −13.252 | ∞ | SPH | 1.0000 | 0.0 |
| 25 | 0.000 | −11.460 | 23.120 | −13.252 | ∞ | SPH | 1.0000 | 0.0 |

TABLE 6

| | |
|---|---|
| FFS-A | $c5$: −1.4922e−003 $c6$: −5.7281e−004 $c10$: −8.3047e−007 $c11$: −5.0837e−006 $c12$: 1.0350e−007 $c13$: 6.3721e−009 $c14$: −1.4688e−008 $c20$: −7.3540e−011 $c21$: −1.8780e−011 $c22$: 7.6324e−010 $c23$: −5.1593e−012 $c24$: −4.6987e−013 $c25$: 5.9297e−013 $c26$: −5.8323e−013 |
| FFS-B | $c5$: −7.6346e−004 $c6$: −8.4026e−004 $c10$: 3.8518e−007 $c11$: −4.0072e−007 $c12$: 3.2578e−008 $c13$: −3.0800e−008 $c14$: −1.2853e−008 $c20$: −9.3943e−011 $c21$: −1.5807e−010 $c22$: 9.0266e−011 $c23$: −1.2974e−013 $c24$: −2.3479e−012 $c25$: −2.8963e−013 $c26$: −1.5035e−012 |
| FFS-C | $c5$: 9.5127e−005 $c6$: 3.7129e−003 $c10$: −4.7376e−006 $c11$: −2.1295e−006 $c12$: −3.3805e−007 $c13$: −1.5424e−008 $c14$: 8.9095e−008 $c20$: −9.4855e−010 $c21$: −1.5134e−009 $c22$: −6.7040e−009 $c23$: −3.0546e−010 $c24$: −6.3692e−014 $c25$: −3.0449e−012 $c26$: −2.7991e−011 |
| FFS-D | $c5$: 1.4424e−003 $c6$: 1.1131e−002 $c10$: 3.3836e−006 $c11$: 2.0445e−005 $c12$: 3.0904e−007 $c13$: −2.9447e−007 $c14$: −1.0762e−007 $c20$: −2.4352e−009 $c21$: 5.4258e−009 $c22$: −2.9078e−008 $c23$: −3.8565e−010 $c24$: 3.8789e−011 $c25$: −1.4098e−010 $c26$: 8.7114e−011 |
| FFS-E | $c5$: −7.6346e−004 $c6$: −8.4026e−004 $c10$: 3.8518e−007 $c11$: −4.0072e−007 $c12$: 3.2578e−008 $c13$: −3.0800e−008 $c14$: −1.2853e−008 $c20$: −9.3943e−011 $c21$: −1.5807e−010 $c22$: 9.0266e−011 $c23$: −1.2974e−013 $c24$: −2.3479e−012 $c25$: −2.8963e−013 $c26$: −1.5035e−012 |
| FFS-F | $c5$: −7.6346e−004 $c6$: −8.4026e−004 $c10$: 3.8518e−007 $c11$: −4.0072e−007 $c12$: 3.2578e−008 $c13$: −3.0800e−008 $c14$: −1.2853e−008 $c20$: −9.3943e−011 $c21$: −1.5807e−010 $c22$: 9.0266e−011 $c23$: −1.2974e−013 $c24$: −2.3479e−012 $c25$: −2.8963e−013 $c26$: −1.5035e−012 |
| FFS-G | $c5$: 6.1700e−005 $c6$: −9.7977e−004 $c10$: 7.4297e−006 $c11$: −6.6954e−005 $c12$: 4.2662e−006 $c13$: 4.4584e−006 $c14$: −7.9442e−007 $c20$: −2.2311e−010 $c21$: 2.5918e−008 $c22$: 7.4662e−008 $c23$: 3.9632e−010 $c24$: −1.3529e−008 $c25$: 2.6380e−009 $c26$: 2.0537e−009 |
| FFS-H | $c5$: 1.1727e−002 $c6$: 7.4942e−003 $c10$: 6.0141e−004 $c11$: 1.5117e−004 $c12$: 5.5364e−005 $c13$: 9.8537e−005 $c14$: −1.8243e−004 $c20$: 1.3330e−006 $c21$: −1.1715e−006 $c22$: 4.6807e−006 $c23$: −7.4287e−007 $c24$: −4.6113e−008 $c25$: 6.2680e−007 $c26$: −2.5414e−007 |
| FFS-I | $c5$: −1.4676e−003 $c6$: −2.1164e−003 $c10$: 3.1861e−005 $c11$: −3.0700e−005 $c12$: −8.3451e−006 $c13$: −9.8191e−006 $c14$: −3.2115e−006 $c20$: −1.9432e−009 $c21$: −9.8494e−009 $c22$: 6.0014e−008 $c23$: −4.6417e−009 $c24$: −1.0597e−009 $c25$: −1.2229e−009 $c26$: −4.0437e−011 |
| FFS-J | $c5$: −8.4119e−003 $c6$: −4.9304e−003 $c10$: −1.7558e−003 $c11$: −5.5086e−004 $c12$: −1.3952e−004 $c13$: −1.1273e−004 $c14$: 7.0478e−006 $c20$: −1.0693e−007 $c21$: −5.3753e−007 $c22$: −4.3112e−007 $c23$: 1.0611e−007 $c24$: 1.6040e−007 $c25$: −1.2690e−008 $c26$: −2.1750e−008 |

This application claims priority from Japanese Patent Application No. 2004-104634 filed Mar. 31, 2004, which is hereby incorporated by reference herein.

What is claimed is:

1. An image displaying apparatus, comprising:

a light source;

a scanning member for two-dimensionally scanning with light from the light source; and an optical system for directing the light deflected by the scanning member for scanning to an observer, the optical system being provided with an optical element in which a plurality of optical surfaces including refracting surfaces and internal reflecting surface are formed on a medium, wherein the refracting surfaces include an incidence surface on which the light deflected by the scanning member is directly incident and an emergence surface from which the light via the internal reflecting surface exits, wherein the light deflected by the scanning member for scanning forms a two-dimensional image on a predetermined surface through a portion of the plurality of optical surfaces of the optical element; and wherein the plurality of optical surfaces formed in the optical element are disposed so that an effective area of the incidence surface and an effective area of the internal reflecting surface do not overlap each other.

2. An image displaying apparatus according to claim 1, wherein said predetermined surface is located on or near an optical surface formed in said optical element.

3. An image displaying apparatus according to claim 2, wherein said optical surface on or near which said predetermined surface is located is a curved surface.

4. An image displaying apparatus according to claim 1, wherein said optical system further has a reflecting member including a reflecting surface, and said predetermined surface is located on or near the reflecting surface of the reflecting member.

5. An image displaying apparatus according to claim 1, wherein said predetermined surface is located on a diffusing reflecting surface.

* * * * *